United States Patent [19]
Selby

[11] Patent Number: 5,086,819
[45] Date of Patent: Feb. 11, 1992

[54] CURVED PRUNER BLADES

[76] Inventor: John S. Selby, 2910 91st Ave. E., Puyallup, Wash. 98371

[21] Appl. No.: 522,761

[22] Filed: May 11, 1990

[51] Int. Cl.⁵ .......................... A01G 23/08; B27L 1/00
[52] U.S. Cl. .................................. 144/2 Z; 144/3 D; 144/343
[58] Field of Search ............... 144/2 Z, 3 D, 338, 343

[56] References Cited

U.S. PATENT DOCUMENTS 3,542,099 11/1970 Gibson ................................ 144/338
3,939,886 2/1976 Tucek ................................. 144/338
3,967,663 7/1976 Loigerot ............................. 144/2 Z
3,981,336 9/1976 Levesque ........................... 144/343

Primary Examiner—W. Donald Bray

[57] ABSTRACT

An improved blade element for a mechanized tree pruner has an upwardly extending blade face which has a concave curvilinear cross section designed so as to provide a closer cut when the mechanized tree pruner is forced upwardly and the pruning knives forced through the individual limbs.

2 Claims, 2 Drawing Sheets

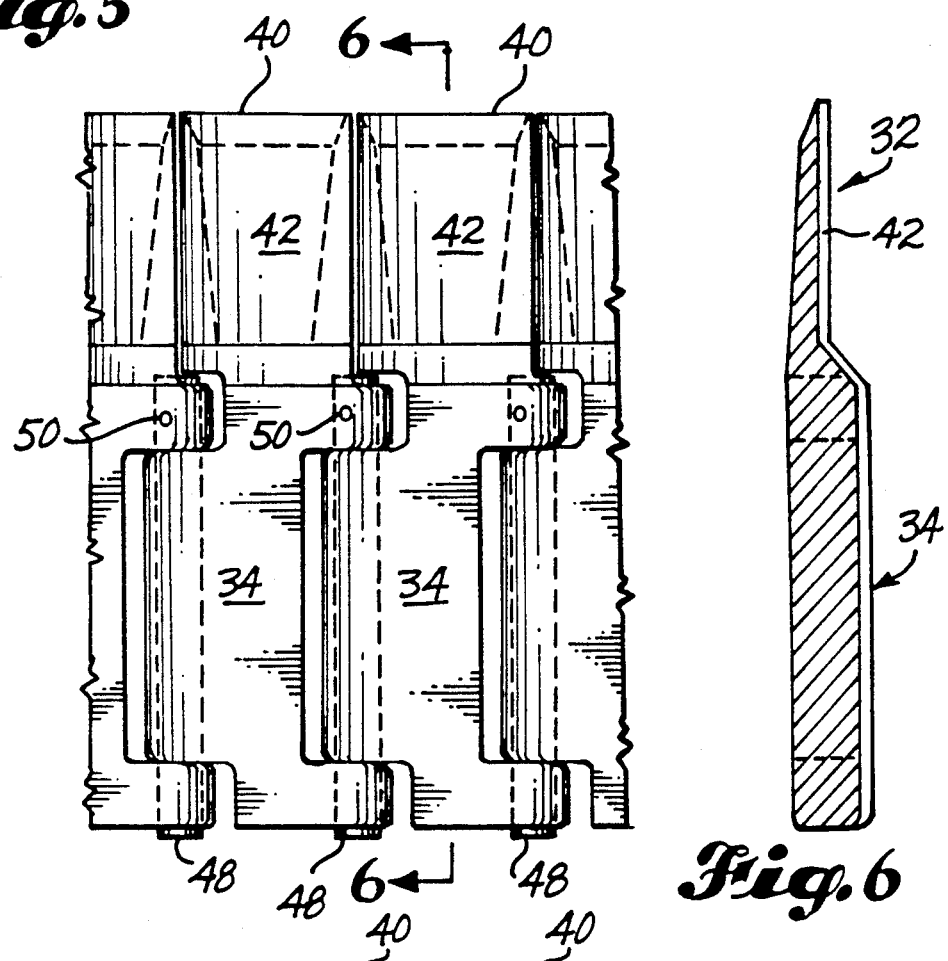
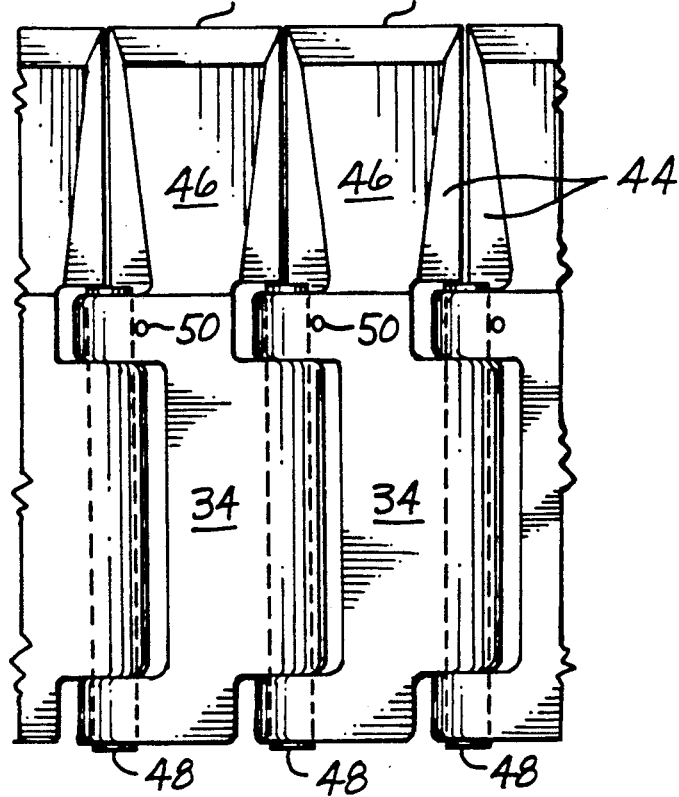

CURVED PRUNER BLADES

BACKGROUND OF THE INVENTION

This invention relates generally to pruning trees and more particularly to a mechanized tree pruner wherein the specific improvement is to the individual blade members combined into pruner belts.

On Nov. 1, 1988 U.S. Pat. No. 4,781,228 issued and was assigned the assignee of the present invention. The disclosure in U.S. Pat. No. 4,781,228 is incorporated herein by this reference. The patent discloses a mechanized tree pruner having a pair of delimbing stations, each of which has so-called knife chains mounted on grapple arms. The chains are composed of individual shearing blades pinned together so as to be flexible and to encircle a tree to be pruned or delimbed. The blade elements in the tree pruner disclosed in the aforementioned patent had flat blades and, as a consequence when the pruner belts were wrapped about the tree, the blades were offset correctly with respect to the tree only where they impacted the tree at their center points leaving longer stobs where they were joined together at the dowel pins.

The present invention represents an improvement in the prior blade design in that curved blades have been found to minimize stob lengths since they are offset a correct amount over their entire width and over the full range of the tree diameters to be pruned. The typical diameter ranges for tree pruning will be from 3-10 inches.

Accordingly, from the foregoing, one object of the present invention is to provide a tree pruner where stob length is minimized.

This and other objects of the present invention will be better understood upon reading the specification to follow in conjuction with the attached drawing.

SUMMARY OF THE INVENTION

Briefly stated, the present invention is practiced in one form by providing a blade element within a knife belt-type tree pruner with a concave curvilinear face haviang a radius of approximately 3.90 inches.

BRIEF DESCRIPTION OF THE DRAWINGS

FIG. 5 is a front elevation view illustrating a plurality of blade elements pinned together.

FIG. 6 is a sectional view taken along lines 6—6 of FIG. 5.

FIG. 7 is a view similar to FIG. 5 showing a rear elevation view, again of a plurality of blade elements pinned together.

DESCRIPTION OF THE PREFERRED EMBODIMENT

Figure 1:
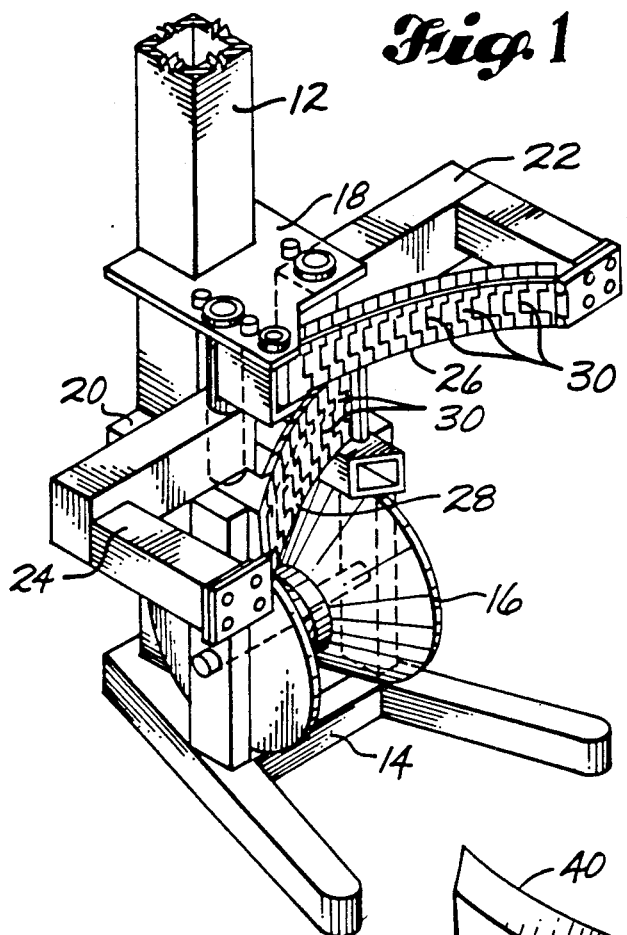
FIG. 1 is an isometric view showing a single delimbing station within a tree pruner as disclosed in the aforementioned U.S. patent.

Referring first and briefly to FIG. 1, a single delimbing station is generally indicated at 10. A rear vertical member 12 serves to support the delimbing station 10 and is connected to a suitable prime mover (not shown). Open base member 14 is in the form of a V-shape to accommodate upstanding trees and also as a horizontal base to support the entire structure at ground level. Vertically spaced above base member 14 is a guide roller 16 configured to accept and help guide an upstanding tree relative to the delimbing station. Horizontal supports 18, 20 serve to support for rotation a pair of vertically spaced grapple arms 22, 24. As is described in detail in the aforementioned U.S. Pat. No. 4,781,228, grapple arms 22, 24 are rotatable about separate pivot points through suitable drive means (not shown) between a closed and an open position. Within each grapple arm is a relatively rigid yet articulated knife belt member, each indicated at 26, 28, respectively. Each belt member 26, 28 is comprised of a plurality of pinned together articulable individual blade members, each indicated at 30. When a tree is to be pruned, grapple arms 22, 24 will be closed so that each respective belt member 26, 28 is wrapped around a portion of the tree so as to substantially encircle the entire circumference of the tree directly adjacent the bark.

Figure 2:
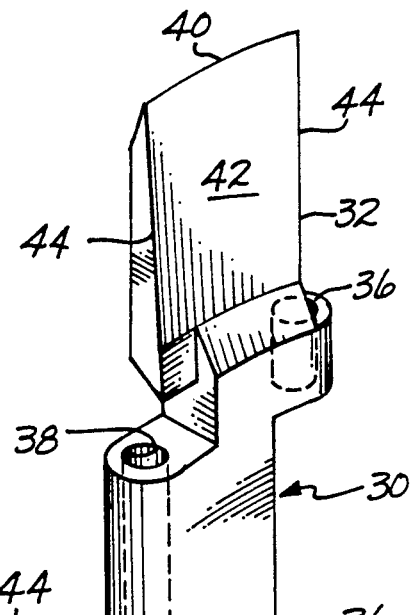
FIGS. 2 and 3 are isometric views from different angles showing an individual blade element.
Figure 3:
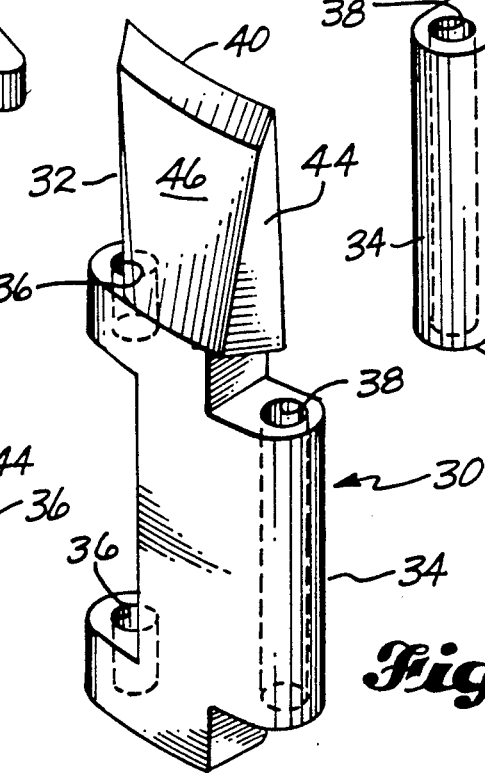
Figure 4:
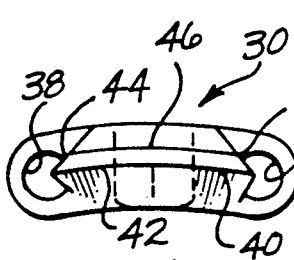
FIG. 4 is a top plan view showing an individual blade element.

Referring now to FIGS. 2-4, in particular, an individual blade member and the improvement which is the subject of the present invention, will be described in detail. Each single blade member 30 is comprised of a top knife section indicated generally at 32 and a bottom or base section indicated generally at 34. The bottom of each blade on one vertical side thereof has a pair of vertically spaced apertured pin holes, each indicated at 36. On the opposed vertical side of each base is an elongated single pin hole indicated at 38. Extending directly upwardly from the bottom of each blade is the top knife section 32. At the extreme upper edge of the knife section 32 is a wedge-shaped knife edge 40. Extending downwardly from knife edge 40 is the concave front face portion 42. Knife edge 40 and front portion 42 have vertically extending sides, each indicated at 44 inclined rearwardly and extending downwardly to the bottom of knife section 32. On the back side of concave front face 42 is the back portion 46. As the back portion extends downwardly from the top knife edge 40 to its lowermost point, it is angled so as to provide an increasing thickness to the overall blade. Each side edge 44, as may be seen clearly in FIG. 4, extends in a vertical plane which is substantially coplaner with the vertical axis of the respective pin holes 36 and 38.

With respect to the curvilinear nature of the front portion 42 of each knife section, it has been found that for delimbing trees within a range of from approximately 3 inches to 10 inches that the radius for the curvilinear surface should be approximately 3.9 inches. Additional appropriate dimensions for an individual blade member 30 will have the blade width from one vertical side to the other along athe outside edges of the pin holes being approximately 2.75 inches with an overall vertical height of the blade member being approximately 8 inches. With respect to the vertical height of the knife section 32, it has been found that it can be approximately 3 inches while the base of the blade 34 will then be approximately 5 inches. In other words a 5:3 ratio has been found to work for the intended purpose. To provide a proper shearing edge at the top end of each blade, the back edge of the top is inclined downwardly at an angle of approximately 22.5°.

Referring now to FIGS. 5-7, a plurality of individual blade members are pinned together through dowel pins 48 and small pins 50 for retaining dowel pins 48 to illustrate their relative positions looking both towards the front faces 42 of the side-by-side blade members in FIG.

5 and toward the back portions 46 as illustrated in FIG. 7. What is important to point out and which is clearly illustrated is the juxtaposed nature of side edges 44 and, therefore, the close joinder of each top corner along the knife edge 40. This provides excellent shearing action during pruning. Also with each front face having the concave radius, it will be appreciated that a more accommodating shearing ring is created to accomplish the intended purpose. The cross-sectional view in FIG. 6 serves to illustrate the relative thicknesses of the top and bottom portions of each blade member with the top portion being relatively thinner since it is the shearing blade while the base is relatively thicker since it must support the top member.

Thus, what has been described is an improvement in tree pruning blades whereby limbs can be pruned closer to the tree surface, thereby improving overall pruning results.

While a detailed description has been given, modifications and changes may occur to those with ordinary skill in the art. All such changes and modifications are intended to be included within the scope of the appended claims.

I claim:

1. A mechanized tree pruner of the type having belt-type knife blades for encircling a tree to be delimbed, having the improvement comprising:
   a plurality of members connected together at pinned points to form a continuous articulatable belt-type knife blade with the blade members having a top knife section with a concave front face and sharp concave top knife edges and further having the side edges of the knife secitons substantially in line with the respective pinned points.

2. The blade members of claim 1 in which the concave front face has a radius of approximately 3.90 inches.

* * * * *